May 19, 1942.  R. D. HELLER  2,283,880
APPARATUS FOR MAKING SCREEN CLOTH
Original Filed July 19, 1940  4 Sheets-Sheet 1
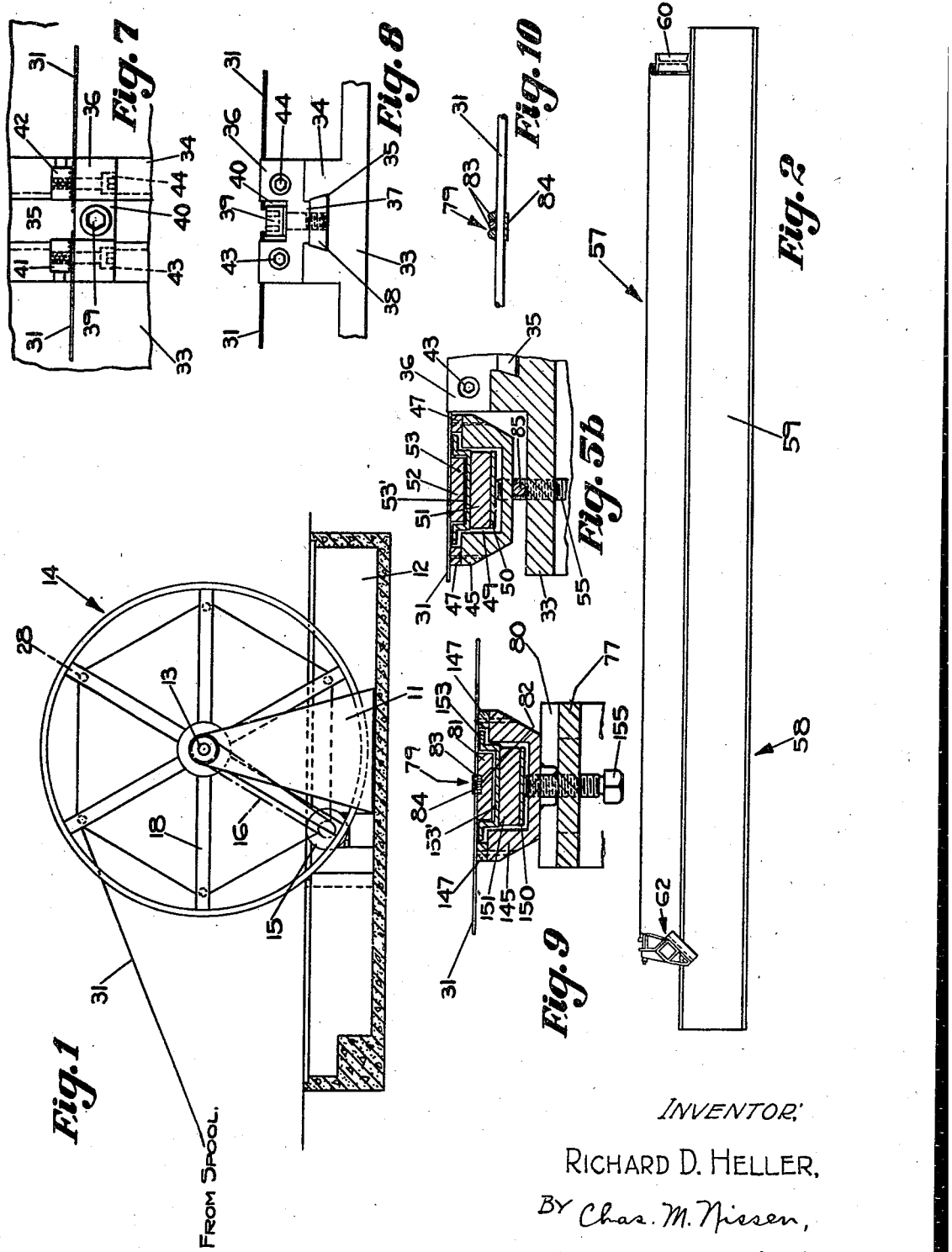
INVENTOR:
RICHARD D. HELLER,
BY Chas. M. Nissen,
ATTY.

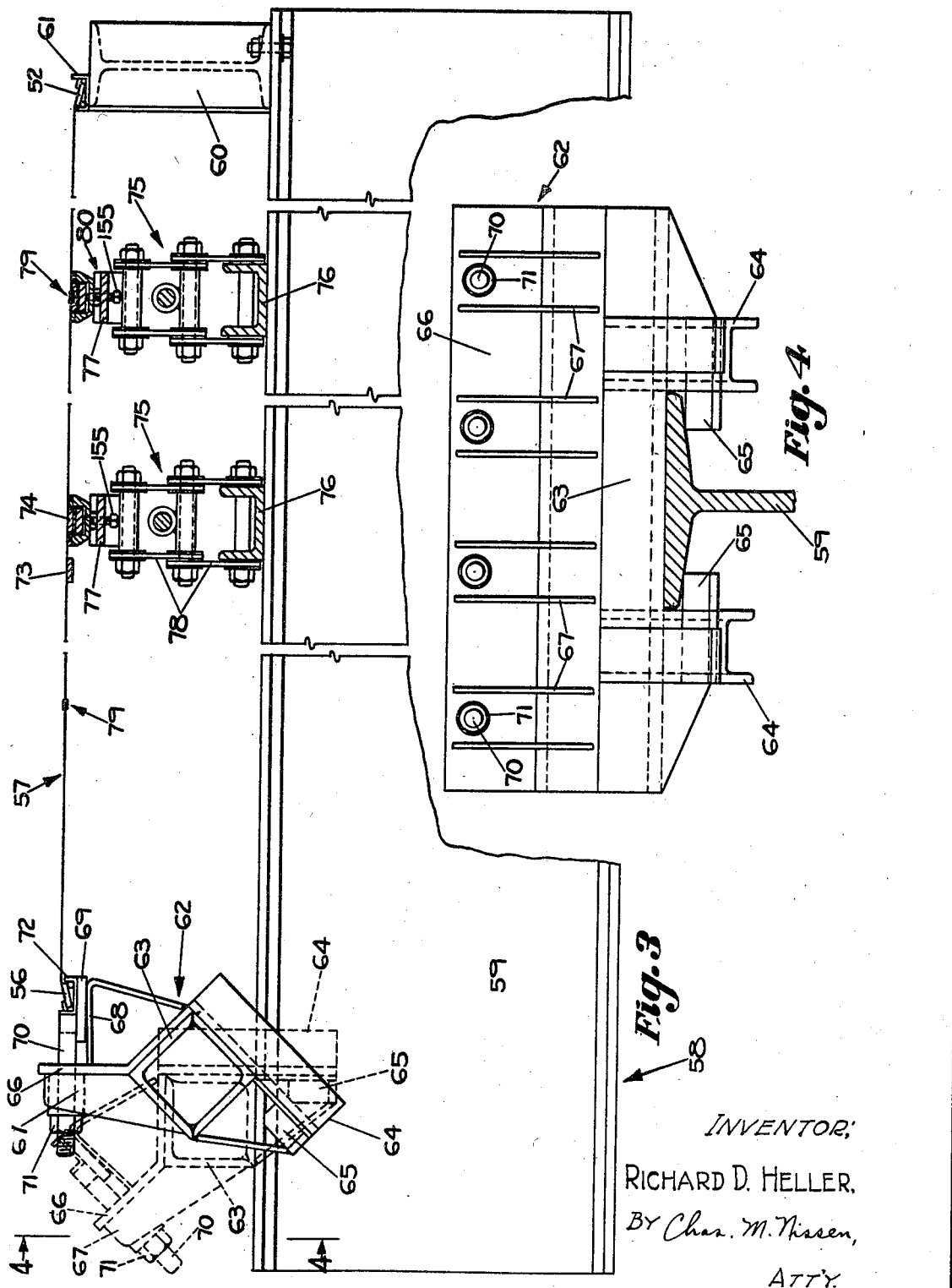

May 19, 1942.　　　R. D. HELLER　　　2,283,880
APPARATUS FOR MAKING SCREEN CLOTH
Original Filed July 19, 1940　　4 Sheets-Sheet 3
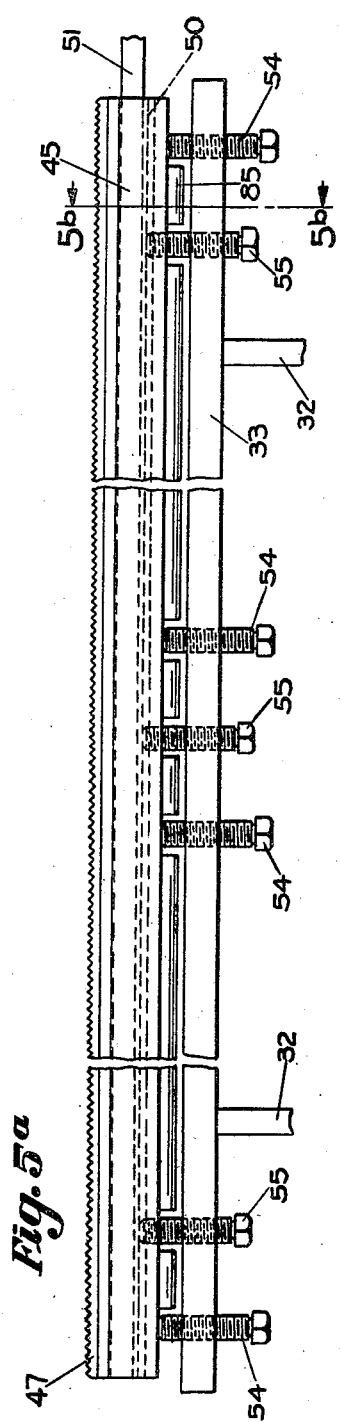
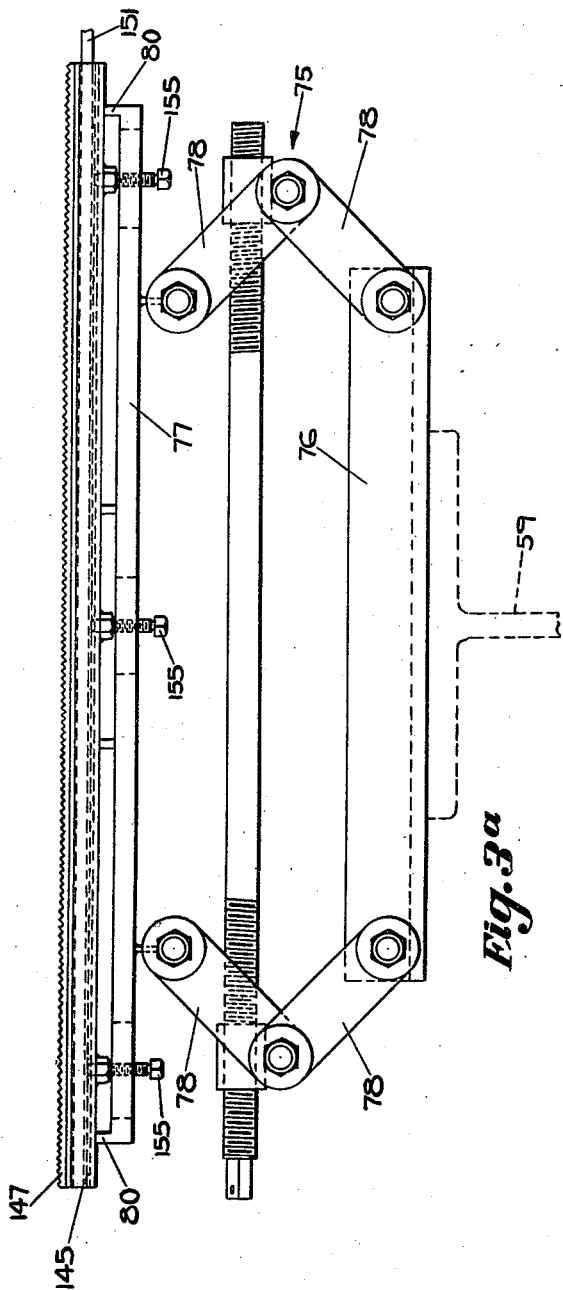
INVENTOR:
RICHARD D. HELLER,
By Chas. M. Nissen,
ATTY.

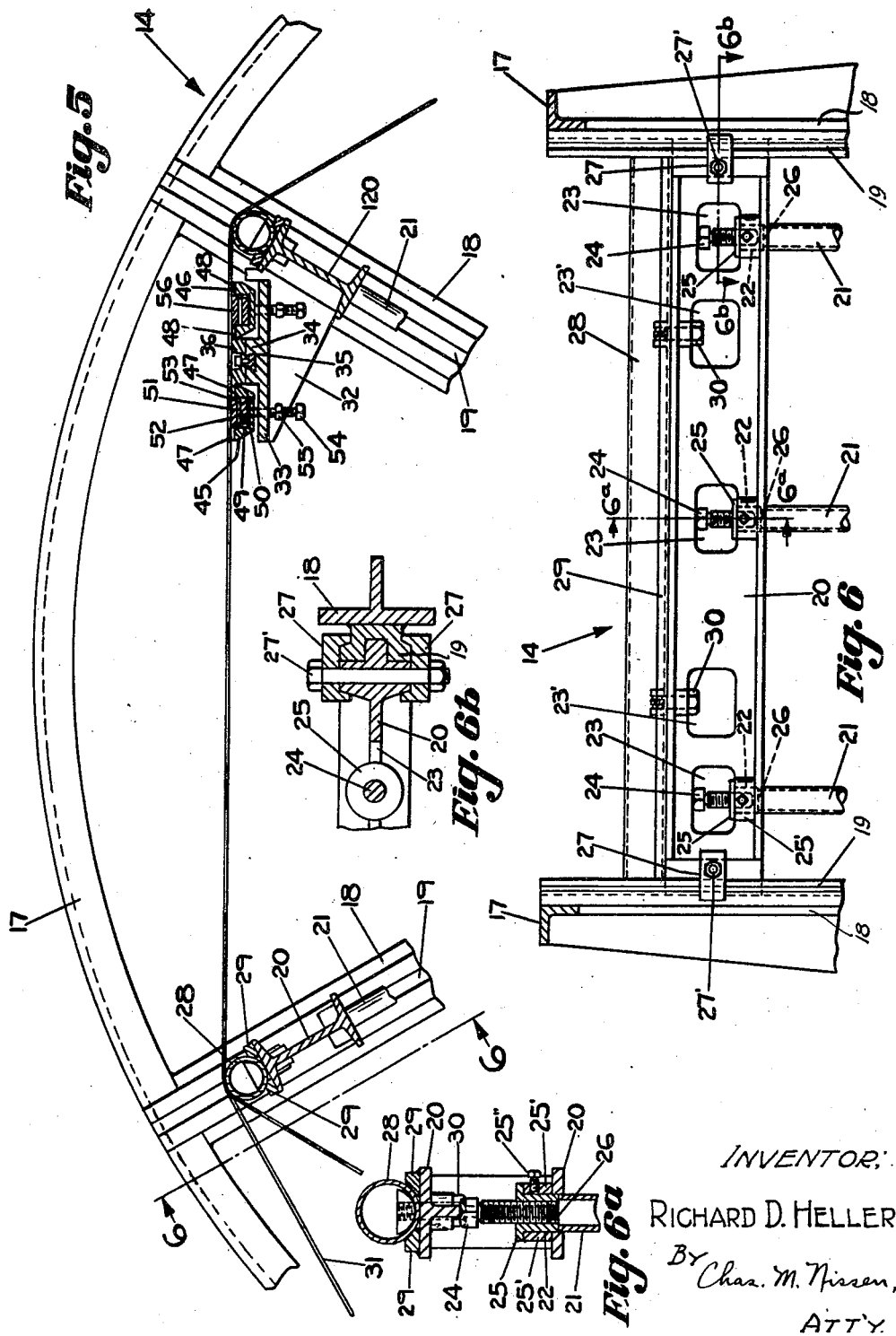

Patented May 19, 1942

2,283,880

UNITED STATES PATENT OFFICE 2,283,880

APPARATUS FOR MAKING SCREEN CLOTH

Richard D. Heller, Columbus, Ohio

Original application July 19, 1940, Serial No. 346,342. Divided and this application April 8, 1941, Serial No. 387,457

28 Claims. (Cl. 140—92.2)

This invention relates to a new and improved apparatus for making screen cloth, particularly of the type comprising a plurality of parallel strands of wire as distinguished from woven type screen cloth.

One of the objects of the present invention is to provide an improved and efficient reel and mechanism associated therewith by means of which wire screen panels may be produced with a minimum consumption of material.

Another object of the invention is the provision of improved and efficient mechanism for soldering connecting bars to parallel strands of wires in screen panels.

Other objects of the invention will appear hereinafter, the novel features and combinations being set forth in the appended claims.

In the accompanying drawings,

Fig. 1 is a side elevational view showing more or less diagrammatically a winding reel or drum for the formation of a screen cloth panel having end bars;

Fig. 2 is a side elevational view of a stretching table for receiving the panel produced while on the reel shown in Fig. 1;

Fig. 3 is an enlarged view of the stretching table of Fig. 2 with the length broken away to accommodate it to a sheet of drawing in which there is also disclosed a pair of jacks for carrying end bars or intermediate strips and soldering apparatus therefor;

Fig. 3ª is a side elevation of the jacks of Fig. 3 carrying the soldering apparatus shown in Fig. 9;

Fig. 4 is an end elevation of the stretching mechanism, taken on the line 4—4 of Fig. 3 looking in the direction of the arrows;

Fig. 5 is an enlarged sectional view of a part of the winding reel or drum of Fig. 1;

Fig. 5ª is a side elevation of the end bar soldering outfit shown in Fig. 5;

Fig. 5ᵇ is an enlarged sectional elevation taken on the line 5ᵇ, 5ᵇ of Fig. 5ª looking in the direction of the arrows;

Fig. 6 is a transverse sectional and elevational view taken on the line 6—6 of Fig. 5 looking in the direction of the arrows;

Fig. 6ª is a sectional elevation taken on the line 6ª, 6ª of Fig. 6 looking in the direction of the arrows;

Fig. 6ᵇ is a sectional plan view taken on the line 6ᵇ, 6ᵇ of Fig. 6;

Fig. 7 is a plan view of a detailed part of the winding reel or drum of Fig. 1 which provides for splicing the wire of the screen cloth;

Fig. 8 is an end view of the structure of Fig. 7;

Fig. 9 is an enlarged sectional view showing the apparatus and method of attaching intermediate strips to the screen cloth; and Fig. 10 shows the construction of one of said intermediate strips.

This application which is directed to my improved apparatus for the manufacture of wire screen cloth, is a division of my co-pending application, S. N. 346,342, filed July 19, 1940, for an improvement in Method for making screen cloth, which co-pending application claims the method herein disclosed. The type of screen cloth produced by such method is illustrated in my co-pending application, S. N. 234,014, filed Oct. 8, 1938, for an improvement in Screens.

The specific form of screen cloth comprising a plurality of parallel wires as shown at 83 in Fig. 10 is described and claimed in my co-pending application S. N. 394,846, filed May 23, 1941, for an improvement in Screen cloth and method of making same. The method of making this specific form of screen cloth is covered in my co-pending application S. N. 415,046, filed Oct. 15, 1941, for an improvement in Screen cloth and method of making same. The apparatus for carrying out such method is covered broadly in the instant application and specifically in my co-pending application S. N. 420,389, filed Nov. 25, 1941, for an improvement in Apparatus for making screen cloth. S. N. 394,846 and S. N. 415,046 were each filed as a division of S. N. 346,342, and S. N. 420,389 was filed as a continuation in part of S. N. 346,342.

In carrying out the method of my invention the screen cloth is first started by winding wire under tension, such as high carbon steel wire on a winding reel or drum 14 disclosed in Figs. 1, 5 and 6 of the drawings. This winding reel or drum 14 comprises a main frame formed by a pair of spaced standards, one of which is seen at 11 in Fig. 1 of the drawings and which is supported in a pit 12.

Extending between the standards 11 is a stationary shaft 13 upon which is mounted a drum, reel or rotor 14 which is driven from an electric motor 15 by appropriate chain and sprocket drive mechanism 16 to rotate the rotor 14 in a clockwise direction as viewed in Fig. 1. The rotor 14 is formed by a pair of spaced rings 17, 17 formed of angle members, each of which is provided with a plurality of spokes 18, 18, of which there are six associated with each ring 17, which number of course may be either increased or reduced as desired.

The spokes 18 provide guides 19 adapted to receive slidably the opposite ends of cross members 20 which, as clearly illustrated in Figs. 5 and 6 of the drawings, are preferably in the form of I-beams. The sliding adjustment between the cross members 20 and the guides 19 of course provide adjustment for the radial distance of each cross member 20 from the axis of the shaft 13, and it is manifest that this adjustment will determine the length of wire required to make a complete convolution.

To determine the position of each of the cross members 20, there is provided a plurality of radial pipes 21, of which there are three illustrated in Fig. 6 of the drawings. The pipes 21 each extends from a center housing or hub of shaft 13 on the rotor 14 on which they are received in appropriate recesses, to an appropriate receiving recess 22 in one of the cross-members 20. In practice I employ three of these radial pipes 21 for each of the cross-members 20, and I have a large group of pipes 21 of different lengths so that by removing a group of pipes 21 of one length and substituting a group of different length, the length of a convolution of wire may be variably determined while at the same time the distance of each cross-piece 20 from the axis of rotation of the rotor 14 is substantially the same with any one group of pipes 21.

If desired, provision may be made for tensioning of the wire after it is wound on the rotor 14 before any of the end bars (52, 56 of Fig. 5) are attached and also for the subsequent de-tensioning thereof after the end bars are attached, by devising means for adjusting each of the transverse I-beams 20, a relatively small amount such as an inch or so, with respect to the pipes 21. Such means for adjusting each I-beam 20 may embody a plurality of openings 23 in each of which is a screw 24 threaded into a cylindrical nut 26 having an integral collar 25, which nut 26 extends loosely into the associated recess 22 in the cylindrical spacer 25', and the latter may be integral with the I-beam 20. The bottom of the nut 26 abuts against the associated pipe 21, as shown in Fig. 6a. It is evident that by adjusting the screw 24 the head of which bears against the top of the opening 23, the nut 26 will be forced into the recess 22 a variable amount which will be limited by the collar 25 engaging the spacer 25', thus precluding the possibility of forcing the pipe 21 entirely out of recess 22. A set screw 25'' may be used to hold the nut 26 in adjusted position relative to the spacer 25'. Within the limits of adjustment provided, it is evident that screw 24 may adjustably determine the relative position of the cross-member 20 with respect to the associated pipes 21 and spokes 18.

After the desired adjustment of the cross pieces 20 has been effected, they are preferably clamped in place by end clamps which are adapted to clamp each cross piece 20 to the associated spokes 18, 18. Such clamps may comprise plates 27 secured to spokes 18, 18 and held against the flanges of the I-beam by means of the bolts 27', 27'. See Figs. 6 and 6b.

To provide a smooth bearing surface for the screen cloth wire each of the cross-members 20 is provided at its top with a bearing pipe 28 which is aligned between the guide means 29 in the form of strips welded to the top of the cross piece 20. The bearing pipe may be removably attached to said cross piece 20 by means of machine screws 30 extending into appropriate openings 23', 23', in the cross piece 20, as shown in Fig. 6. The structure of all the cross pieces 20 and associated members is substantially that illustrated at the left of Fig. 5 and in Fig. 6 of the drawings.

Associated with one of said cross pieces 20, as shown at the right of Fig. 5 and in Figs. 5b, 7 and 8, is a special structure which is for the purpose of carrying means for attaching two end bars of ultimate sections of screen cloth to the wire which has been wound upon the rotor 14.

Before describing this structure it may be pointed out that the high carbon steel or other wire 31 which forms the screen cloth is wound upon the reel, drum or rotor 14 by rotating the same from the drive motor 15 in a clockwise direction, as viewed in Fig. 1, while the wire 31 is fed from a spool through appropriate wire stranding mechanism and wire tensioning mechanism if desired, until the desired width of screen is formed on said rotor 14. The spacing of the wire 31 may be by appropriate lateral feeding mechanism associated with the wire 31 in cooperation with threaded spacer strips hereinafter described more completely.

Before describing the manner in which the winding of the wire 31 is started, stopped and possibly spliced, attention is directed to Fig. 5 of the drawings and to the mechanism associated with the right hand cross member 120. Attached to said cross member 120 is a plurality of brackets, one of which is seen at 32 to which is attached a plate 33 extending substantially the full length between the two opposite rings 17 of the rotor 14. The plate 33 is provided with a center boss 34 which extends longitudinally the entire length of said plate 33 and which is provided with a dovetailed groove 35 which also extends the full length thereof.

Slidably mounted on the boss 34 is a plurality of clamping members, preferably three in number, having the construction illustrated particularly in Figs. 7 and 8 of the drawings. Each of said clamping members comprises a body 36 having a bottom boss 37 adapted to extend into the groove 35 associated with which is a dovetailed clamping block 38 adapted to receive a machine screw 39 which extends through the boss 37 and threads into said clamping block 38, the head of which is received in a center groove 40 in the body 36. It is manifest that by loosening the machine screw 39 the body 36 may be slid along the boss 34 and by tightening said screw 39 it may be clamped in any desired position.

The body 36 has two separate wire clamping members 41 and 42 spaced on opposite sides of the center groove 40 and provided with separate clamping machine screws 43 and 44 respectively.

As clearly illustrated in Fig. 7 of the drawings, severed ends of wire 31 may be clamped to the body 36 by the clamping members 41, 42. As previously stated there are three pairs of these clamping members 41 and 42. The reason for this number is as follows: There is one of these clamping members or the equivalent thereof adjacent each ultimate edge of the screen as it is wound on the rotor 14. Of course to start the winding of the wire 31 on the rotor 14 a free end must be clamped to something and such a free end is clamped to one of the clamping members which is adjacent one side of the rotor 14. As the rotor 14 rotates, the wire 31 of course progresses laterally across the rotor until the desired width thereof has been wound on the rotor. The width of course is known before the winding operation starts and so the second clamping member is placed at the desired distance from the first clamping member to provide for this desired width of screen cloth, and when the desired width is wound on, the wire 31 is clamped to this second clamping member.

It may be stated that in using the first and second clamping members which are described, the wire will be clamped to both of the clamping members 41 and 42.

The third clamping member is placed loosely on the boss 34 between the first and second so it can be freely adjusted along the groove 35. In my case it will not be used at all but the purpose of it is simply this: In case a spool of wire 31 comes to an end or is spliced, it is of course essential to take care of either such condition, and this is done by setting this third clamping member when either such condition arises and clamping the wire 31 as it comes from the spool by the clamping member 42. The wire 31 is then severed adjacent the clamp 42 as clearly illustrated in Fig. 7 of the drawings. If a splice has been effected, the new screen of wire 31 is cut so as to eliminate the splicing portion and the free end of this new wire is then clamped by the clamping member 41 and the operation of winding the wire 31 on the rotor 14 is continued. It is to be noted that the wire 31 is very closely adjacent the top of the body 36 and this body 36 is so constructed that if the screen cloth is of relatively fine mesh the successive strands thereof may readily pass over the top of said body 36 without elongating these strands as compared with any strands which are laterally spaced from the body 36 of the intermediate clamping member. It is particularly significant to note as I shall point out more completely hereinafter, that the severed wire 31 leading from the clamping members 41, 42 of the intermediate clamp is no detriment whatever to the ultimate screen, because all of the strands of wire are ultimately severed substantially along the line of the boss 34.

After the desired amount of wire 31 has been wound on the rotor 14 to provide the desired width of the screen cloth and the ends have been clamped as above described, the wire 31 as it comes from the spool is of course severed after it is clamped to the final clamp. Under these conditions if it is desired to adjust the tension of the wire 31, this may be done by the previously described set screws 24. With the wire 31 properly tensioned, I then solder or otherwise attach two end bars 52, 56 to the parallel strands of wire 31, which end bars ultimately are end bars of different sections of screen cloth; that is, the length of each convolution of wire 31 which is wound on the rotor 14 is sufficient to make up two or more sections of screen cloth rather than being only long enough to make up only one section. To effect the attachment of these two end bars which, as previously pointed out, will ultimately be associated with different sections of screen cloth, there is provided a pair of channel members 45 and 46 (Fig. 5) which extend longitudinally with respect to the plate 33 and boss 34 and transversely with respect to the axis of the wire 31, said channel members 45 and 46 being on opposite sides of said boss 34.

Adjacent each edge of the channel member 45 is a strip 47 which has a plurality of spaced grooves (Fig. 5ª) therein which correspond with the mesh of the screen cloth which is to be formed. One way of making these strips 47 is to take a threaded pipe which has a number of threads per inch which corresponds with the mesh of screen cloth desired, and cutting the pipe into longitudinal strips about ½" wide which are held between spaced holding means, one at each end of the channel member 45. The channel member 46 is also preferably provided with channel strips 48.

At the bottom of the trough 49 there is loosely placed a bearing strip or plate 50 upon which is placed a longitudinally extending heater element 51 preferably in the form of an electrical heater upon which is placed an end bar 52 which is ultimately soldered to the successive strands of wire 31. See Fig. 5ᵇ. Interposed between the end bar 52 and heater 51 and extending along the sides thereof is a metal tray 53 for supporting therein and thereon a strip of asbestos 53'. It may be stated that the channel member 45, the heater element 51 and the asbestos 53' are fundamental structure, inasmuch as it is preferred that the asbestos be between the end bar 52 of the heater element 51 which is not the case in the disclosure of said Patent No. 2,220,106.

In order to provide adjustments for effecting the proper relation between the parallel strands of wire 31 and the end bar 52 prior to the soldering operation, two separate adjustments are provided which I shall now describe.

Extending longitudinally of the plate 33 under the channel 45 and threaded therethrough is a plurality of set screws 54 which abut against the bottom of the channel 45. It is thus evident that by adjusting these set screws 54 the channel member 45 may be elevated with respect to the plate 33. This not only makes possible the levelling of the channel member with respect to the plane of the strands of wire 31 but is particularly effective to force the grooved strips 47 into intimate contact with the strands of wire 31 thus insuring the proper spacing of said wires 31 before the end bars 52 are soldered in place.

It is also desirable to force the end bar 52 against the successive strands of wire 31 independently of the above described action in forcing the strips 47 thereagainst and to this end there is another set of a plurality of set screws 55 which thread through the plate 33 and which extend freely through non-threaded openings in the bottom of channel member 45 and bear against the bearing plate 50. These set screws 55, like the set screws 54, are distributed along the longitudinal length of the channel 45, (Fig. 5ª) and consequently when said set screws are adjusted they force the bearing plate 50, the heater element 51 and the end bar 52 upwardly, thereby insuring intimate contact between said end bar 52 and the strands of wire 31. This also insures intimate contact between the heater element 51 and the end bar 52 through the asbestos element 53'. This insures a good transfer from the heater element 51 to the end bar 52. The interposed auxiliary channel 53 and sheet asbestos 53' will become heated up in a short time and does not prevent an effective transfer of heat from heater element 51 to end bar 52, which heat of course is employed to melt the solder which attaches the wires 31 to end bar 52.

Associated with the channel member 46 is the same combination of elements which I above described is association with the channel member 45, and consequently they need not be described in detail.

The operation of the apparatus so far described with the consequent realization of so much of the method which is performed thereby may now be preferably described by way of review. The free end of the spool of wire 31 to be used in forming the screen cloth is attached to one end clamp member 36, 37, etc., as shown in Fig. 8, after the cross-members 20 have been adjusted as previously described to produce a length of screen cloth which is sufficient to make the number of screen panels each of the predetermined length desired. For example, suppose it is desired to make two screen panels each 5' long and 3' wide. Under these conditions the cross-members 20 are adjusted so that the length of any convolution of wire 31 is slightly in excess of 10', the excess being as little as possible in order to reduce waste to a minimum.

With the free end of wire 31 attached to one side of the rotor 14, the latter is rotated by means of the motor 15 and the wire 31 wound up, the wire being fed laterally at a rate determined by the desired mesh of the screen cloth. Any splicing of the wire 31 will be eliminated as above described.

When the width of the cloth on the rotor 14 has reached the desired value which, in the illustration given, is 3', the wire 31 will be clamped to the second clamp 36, 37 etc., and the end thereof severed. Thereupon the channel members 45 and 46 which were previously removed from the plate 33 during the entire winding operation are put in place together with the parts associated with them which were previously described. The set screws 54 and 55 are then successively adjusted, the first to bring the strip 47 into intimate contact with the successive strands of wire 31, and the latter to force the end bar 52 in intimate contact with said successive strands of wire 31. It is to be understood that a duplicate operation and duplicate equipment is provided in association with the two channel members 45 and 46 so that there will be two spaced apart bars attached the the convolutions of wire 31. Thereafter each of these two bars, that is, the end bar 52 associated with the channel member 45 and another end bar 56 associated with channel member 46 are soldered in place as aforedescribed, it being understood that the inner edges of the two end bars 52 and 56 are ultimately to be the outer extremities of separate panels of screen cloth.

After said end bars 52 and 56 have been soldered or otherwise attached to the convolutions of wire 31, said convolutions are cut along the line of trough 49. If this cutting operation were performed while the convolutions of wire 31 were under tension as they are before and during the soldering operation, damage might be done either to the mechanism, the screen cloth or the operator, so to relieve the tension one or more of the cross-members 20 are adjusted towards the axis of rotor 14 by adjusting the set screws 24 associated therewith after the clamp means 27 has been released.

With the convolutions of wire 31 severed as aforedescribed, it is of course evident that the elongated panel of screen cloth may readily be removed from the rotor 14 and there will be an end bar at each end with the ends of wire extending slightly beyond each end bar. These wire ends are then cut to a desired length if necessary and bent over with an extended strip of metal which preferably extends over the outer end of each end bar as described completely in Patent No. 2,220,106.

As I previously pointed out, I have thus provided an elongated panel of screen cloth which is illustrated at 57 in Figs. 2 and 3 of the drawings, and this panel 57 is now to be further treated to make a plurality of sections of screen cloth, which may be two or more such sections. This further operation is performed on mechanism now to be described, and of course it frees the winding reel or drum 14 for further operation or, in other words, for the making of successive panels.

Attention is now directed particularly to Figs. 2, 3, 4, 9 and 10 of the drawings which illustrate the apparatus and some of the steps involved in the treating of the panel 57 which has been removed from the winding reel or drum 14. Mechanism for treating said panel of screen cloth 57 is in the form of a table 58 comprising a main frame 59 which I have found can be conveniently made by merely taking a desired length of very heavy I-beam, to one end of which is attached a bracket 60 having at its top a holding bracket 61 for removably receiving one of the end bars such as the end bar 52, which bracket 61 may take the form of the bracket associated with the deck of the screen which attaches the screen cloth thereto as disclosed and claimed in my co-pending application Serial No. 234,014.

The bracket 61 has a length comparable with the length of the longest end bar 52 which can be handled by the winding reel or drum 14. To provide for supporting and stretching the panel of screen cloth 57 I have provided means for attaching the other end bar 56, which is shown particularly in Figs. 3 and 4 of the drawings and which comprises an adjustable bracket 62 which is slidable along the top flanges of the main frame 59 so as to be positioned at the proper distance from the bracket 60 to receive the length of panel of screen cloth 57, it being of course understood that the length of these panels will vary from time to time.

The bracket 62 comprises a box-like construction 63 which may be formed by welding together a pair of angular members from which extends downwardly a pair of spaced arms 64, 64 which extend below the top flange of main frame 59. Extending inwardly from each of the arms 64, 64 is a locking block 65. Extending upwardly from the box construction 63 is an arm 66 which, as clearly shown from Fig. 4 of the drawings, has an appreciable width and is provided with spaced reinforcing plates 67. Extending across the face of the arm 66 is a shelf 68 upon which is slidably mounted a plate 69 to which is attached a plurality of bolts 70 which extend through the arm 66 and are provided with nuts 71. The plate 69 also carries an attaching bracket 72 similar to the attaching bracket 61 for removable attachment to the end bar 56 of the panel of screen cloth 57.

To adjust the bracket 62 to the desired position to receive the end bar 56, it is moved to the dotted line position illustrated in Fig. 3 of the drawings where one side of the box 63 has a large bearing area of contact with the top flanges of main frame 59 under which conditions the locking blocks 65 are spaced from the lower surfaces of the top flanges of main frame 59 whereupon the bracket 62 may slide freely along said main frame 59. When said bracket 62 has reached the position desired, it is rotated clock-wise from the dotted line position illustrated in Fig. 3 of the drawings to the full line position in which position there is a relatively sharp edge of the box-like construction 63 in contact with the top of the main frame 59, and the two locking blocks 65 are in contact with the lower surfaces of said flanges in a position to the left of that position where said edge of box 63 contacts the top surface of main frame 59. Under these conditions it is of course evident that any force which tends to rotate the bracket 62 in a clock-wise direction shall effect a clamping action between said sharp edge of box 63 and the top of the flanges of the main frame 59 and between the clamping blocks 65 and the bottom of said flanges, thus securely clamping the bracket 62 in place. Such action is of course afforded by the tensioning of the panel of screen cloth 57 which is effected by virtue of the connection of the end bar 56 to the attaching brackets 72, the ultimate tension being applied by adjusting the nuts 71; the end bar 56 being attached to bracket 72, of course when these nuts are released sufficiently to permit this operation to be performed. Nuts 71 are adjusted to tension the panel of screen cloth 57 evenly over the entire area.

With the panel of screen cloth 57 thus tensioned on the table 58, the next operations are those of attaching the desired number of end bars and intermediate strips. In the illustration given the panel 57 was to be made into two sections of screen cloth, and consequently it is necessary to attach two additional end bars. Such end bars are illustrated at 73 and 74 in Fig. 3 of the drawings, and their manner of attachment will now be described.

I provide one or more parallel motion jacks 75 each of which has a bottom plate 76 and a top plate 77. Each top plate 77 can be adjusted in height with respect to the bottom plate 76 by screw operated parallel link mechanism 78 while maintaining the top plate 77 parallel to the bottom plate 76 at all times. The bottom plates 76 of the jacks 75 merely rest on the top of main frame 59 so that either jack 75 may be placed in any position. A plurality of such jacks are preferably employed so that a plurality of operators may perform the advance functions which are to be performed on the panel of screen cloth 57 simultaneously. (Figs. 3 and 3ª.)

To attach the end bars 73 and 74 and cross strip 79 as shown in Fig. 3, generally similar operations are performed. The operation of attaching the cross strip 79 (Fig. 10) will now briefly be described.

The jack 75 is placed at the desired position below that where the cross strip 79 is to be attached, and said jack is adjusted so that the plate 77 is at approximately the proper height. Then plate 77 is provided with transverse web 80 (Figs. 3, 3ª and 9) upon which is supported a channel member 145 and associated structure which is similar to that previously described in connection with channel member 45, it being understood that channel members associated with channel 149 have a reference number in which the number "1" precedes the numbers used in Fig. 5. After the channel 145 and the associated parts are in their proper places, the jack 75 is adjusted to force an intimate contact between the guide strips 147 and the wire 31 whereupon set screws 155 are adjusted to force the heater element 151 upwardly against the metal tray 153 and the asbestos 153' therein against the bar 81 which is not an end bar in this instance but which is substituted for an end bar and is provided with a center groove 82 (Fig. 9) in which are placed a plurality of strands of wire 83 (see Fig. 10) which may be of the same constituency as wire 31. The groove 82 is treated to preclude solder adhering thereto.

With the parts adjusted as illustrated in Fig. 9 and as above described, the wires 83 will be forced into intimate contact with the wires 31 and the strip of solder which is laid on top of the wires 31 above the wires 83, is melted after a reasonable heating period by the heat from heater element 151. While the solder is in the molten condition a strip 84 of tin plate (sheet iron coated with tin) is laid on top of the wires 31 whereupon the current to heater 151 is cut off and the solder allowed to solidify with the tin plate strip 84 soldered to one side of the wires 31 and the transverse wires 83 soldered to the other side of the wires 31, thereby producing the cross strip connection 79 as illustrated in Fig. 10 of the drawings.

The illustration in Fig. 10 is of course reversed from that in Fig. 9 because Fig. 10 shows the operating position of the screen cloth with the wires 83 on top thereof while Fig. 9 shows the position thereof while the screen cloth is being manufactured. Where special conditions of use of the screen cloth require the cross strips 79 to be the reverse of that illustrated in Fig. 9, it is only necessary to turn the panel of screen cloth 57 over and provide a reverse type of brackets 61 and 72 which may be provided and substituted for those illustrated in Fig. 3 of the drawings. When the brackets 61 and 72 are used upside down from their positions shown in Fig. 3, the supports 60 and 69 may be modified accordingly.

To attach an end bar such as an end bar 73 or an end bar 74, the operation is exactly the same as that required to attach a cross strip 79 except for the fact of course that instead of the bar 81 I provide the end bar to be attached and the soldering operation is the same as that previously described in connection with end bars 52 and 56 (Fig. 5).

After the desired number of cross strips 79 and end bars, such as end bars 73 and 74, are attached, the panel of screen cloth 57 has its tension slackened by retracting the nuts 71 whereupon said panel 57 is cut between each pair of end bars which, in the illustration given, will be between the end bars 73 and 74. Thereafter, if the extended lengths of wire beyond the end bars are excessive, they will be clipped off, bent over said end bars and covered by strips of tin plate which extend beyond each edge of the associated end bar 73 or 74 and also bent over as shown in my above mentioned Patent No. 2,220,106. In other words, the bent over ends of the wires may have soldered thereto strips of tin plate likewise bent over to cover the end portions of the wires 31 including the bent over ends.

As previously indicated, it is possible to make more than two sections or panels of screen cloth on the table 58, and the number of such sections or panels can be readily determined in advance by the available length of the table and the length of each section or panel desired. The number of persons that can operate on the panel of screen cloth 57 will vary with many conditions, but it is evident that more than one person may be operating on it at the same time in attaching end bars or cross strips.

It is furthermore to be noted that the number of tables 58 and the number of winding reels or drums 14 need not be the same. For example, it may be found that under certain conditions one winding drum 14 when operated continuously will supply enough material for more than one table 58 or a reverse condition might exist. Purely as illustrative there might be available three winding reels or drums 14 and seven tables 50, all of which would be kept busy substantially all the time. This increases clearly the flexibility of operation and makes possible the maximum utilization of the equipment at all times which is not possible when all the work is performed on the winding drum or reel.

As shown in Fig. 5ᵇ the screw 55 is threaded through the plate 33 (Fig. 5) but extends loosely through an opening in the bottom of the channel 45. A transverse pin 85 extending through the screw 55 serves to carry the channel 45 upwardly and at the same time the channel may tilt or rock on the pin 85 to equalize the pressure of strips 47, 47 on the wires 31. The pin 85 also acts as a stop to limit the extent to which the screw 55 may be moved upwardly and this limit stop action serves to hold the end bar 52 against the wires 31 with a predetermined pressure. By the use of the pins 85 the screws 54 may be eliminated.

As shown in Fig. 3 the platform 33 is supported by two spaced-apart brackets 32, 32 and since the convolutions of wire are all within the limits of the end wheels of the reel 14 the length of the platform 33 is approximately coextensive with the spacing of these wheels. After the ends of the wire convolutions are secured by means of the clamping mechanism shown in Figs. 8 and 9, the wires are preferably subjected to tension by moving one or more of the pipes 28 radially outward. When the wires are taut operation of the soldering apparatus shown in Figs. 2 and 4 is facilitated. After the end bars have been soldered to the convolutions of wires above the platform 33, the tension on the wires may be relieved by retraction of one or more pipes 28 whereupon the wirs between the attached bars 52, 56 may be severed.

It should be particularly noted that I prefer to produce panels of screen cloth having only end bars and no intermediate parallel strips, by means of the structure shown in Figs. 1, 5, 5ᵃ, 5ᵇ, 6, 6ᵃ, 6ᵇ, 7, and 8 including the winding reel and end bar soldering mechanism. In order to complete the screen cloth in readiness for use in a screen vibrating apparatus with the end bars and intermediate strips extending longitudinally and the wires transversely, I prefer to add the strips 79 of Fig. 10 by means of the apparatus illustrated in Figs. 2, 3, 3ᵃ, 4, 9 and 10 including the panel stretching mechanism and the strip soldering means. It will thus be seen that the manufacture of the complete screen ready for use in a vibrating machine involves a method having two main steps, one for the production of the panel 57 (Figs. 2 and 3) and the other for addition of the intermediate parallel strips 79. Furthermore, while a plurality of panels 57 may be produced in connection with the reel it is preferred to divide one long panel 57 from the reel into two or more shorter panels by means of the apparatus shown in Figs. 3, 3ᵃ and 4.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In mechanism for attaching a connecting bar to a screen cloth panel, the combination with a support, of a channel bar mounted on said support, strips at the edges of said channel bar in position to engage the wires of said screen cloth panel, and means for adjusting said channel bar relative to said support to press said strips against the wires.

2. In mechanism for attaching a connecting bar to wires in the formation of a screen cloth, the combination with a support, of mechanism for holding the wires mounted on said support, means comprising a channel bar for supporting the screen cloth connecting bar in engagement with the wires while the latter are mounted on said support, and means between said support and said channel bar to adjust the latter toward the wires to clamp the said connecting bar against said wires preparatory to securing such connecting bar to the wires.

3. In mechanism for attaching a connecting bar to a screen cloth, the combination with a support, of a channel bar mounted thereon, a connecting bar heater in the channel portion of the channel bar, and means for adjusting the connecting bar heater relative to the channel bar to facilitate heating of the connecting bar before attachment to the screen cloth.

4. In mechanism for attaching an end bar to wires in the formation of a screen cloth, the combination with a support, of a channel bar mounted thereon, means for adjusting the channel bar relative to said support, an end bar heater in the channel portion of said channel bar, and means for adjusting said end bar heater relative to said channel bar.

5. In mechanism for soldering a connecting strip to a wire screen, the combination with a support, of a parallel motion jack for adjusting the elevation of said support while keeping it level, a channel bar mounted on said jack to extend transversely of said screen intermediate the ends thereof, a heating element in the channel portion of said channel bar, an additional channel above said heating element, a hot plate in the last-named channel, transverse strip material in contact with said wires, and means for effecting lifting of the heating element to force said hot plate against the wires to facilitate soldering of said transverse strip material to the wires of the screen.

6. In mechanism for soldering an end bar to a wire screen panel, the combination with a support, of a channel bar, a plurality of spaced-apart set screws extending upwardly through said support to the bottom of said channel bar to adjust the elevation of the latter relative to said support, means comprising a heating element in the channel of said channel bar for soldering an end bar to the wire screen panel, and a plurality of additional set screws extending through the bottom of said channel bar to move the heating element upwardly toward the wires to which said end bar is to be soldered.

7. In mechanism for attaching an end bar to wires in the formation of a screen cloth, the combination with a support, of a channel bar mounted on said support and having narrow elongated strips at the upper edges of the channel in position to engage spaced wires of the screen cloth, and means for pressing said elongated strips against said wires.

8. In mechanism for attaching an end bar to wires in the formation of a screen cloth, the combination with a support, of mechanism for holding the wires on said support, means comprising a channel bar for supporting screen cloth connecting means in engagement with the wires while the latter are mounted on said support, and means for clamping the said connecting means against said wires preparatory to securing such connecting means to the wires.

9. In mechanism for attaching connecting means to screen cloth wires, the combination with a support, of a channel bar mounted thereon, a heater for such connecting means located in the channel portion of the channel bar, and means for adjusting the said heater relative to the channel to facilitate heating of said connecting means before attachment to the said wires.

10. In mechanism for attaching connecting means to wires in the formation of a screen cloth, the combination with a support, of a channel bar mounted thereon, means for adjusting the channel bar relative to the said wires, a heater in the channel portion of said channel bar, and means for the said heater relative to said channel bar to effect the application of heat to said connecting means and the engagement of the latter with said wires while said connecting means is being attached to such wires.

11. In mechanism for soldering a cross-strip to a wire screen intermediate the ends of the latter, the combination with a support, of a channel bar mounted on said support to extend transversely of said screen intermediate the ends thereof, a heating element in the channel portion of said channel bar, a channel of solder resisting material above said heating element, a hot plate in said last-named channel, transverse strip material in contact with said wires, and means extending from said support through said channel bar to said heating element to lift the latter to force the hot plate against the wires to facilitate soldering of said transverse strip material to the wires of the screen intermediate the ends of the latter.

12. In mechanism for soldering a connecting bar to a wire screen panel, the combination with a support, of an elongated channel bar, a plurality of spaced-apart lifting screws distributed along said support to extend upwardly through the latter to the bottom of said channel bar to adjust the elevation of the latter relative to said support, means comprising a heating element in the channel of the elongated channel bar for soldering said connecting bar to the wire screen pannel, and a plurality of additional lifting screws distributed along said channel bar and extending through the bottom of the latter in positions to move the heating element upwardly toward the wires to which said connecting bar is to be soldered.

13. In mechanism for soldering a connecting bar to a wire screen panel, the combination with a support, of an elongated channel bar, a plurality of spaced-apart lifting screws distributed along said support and threaded upwardly through the latter into engagement with the bottom of said channel bar to adjust the elevation of the latter relative to said support, means comprising a heating element in the channel of the channel bar for soldering said connecting bar to the wire screen panel, and a plurality of additional lifting screws distributed along said support and threaded through the bottom of the latter and passing freely through openings in the bottom of said channel bar into engagement with the bottom of the heating element to move the latter upwardly against the wires to which said connecting bar is to be soldered.

14. In mechanism for soldering a connecting bar to a wire screen panel, the combination with a support, of a channel bar, a heating element in the channel of said channel bar, lifting mechanism comprising a screw threaded through said support and extending freely through an opening in the bottom of said channel bear into engagement with the lower side of said heating element, and a stop on said screw in position to engage the bottom of said channel bar to limit the lifting of said heater element relative to said channel bar.

15. In mechanism for soldering a connecting bar to a wire screen panel, the combination with a support, of a channel bar, a heating element in the channel of the channel bar, lifting mechanism comprising a screw threaded through said support and extending freely through an opening in the bottom of said channel bar, and an abutment on said screw between said support and said channel bar serving to limit the upward movement of the said screw through the bottom of said channel bar and thereby limiting the lifting of the heating element relatively to said channel bar, the construction and arrangement being such that threading said screw through said support acts to lift said heater element into such position relative to said channel bar that when the said abutment engages the bottom of the channel bar and the elevation of the screw is continued the connecting bar carried by the heating element and the upper edges of the channel bar will all be pressed against the wires to which the connecting bar is to be soldered.

16. In mechanism for attaching a connecting bar to wires in the formation of a screen cloth, the combination with a support, of a channel bar mounted on said support, strips at the edges of said channel bar and each provided with a multiplicity of parallel grooves adapted to engage the wires of the screen cloth, and means for adjusting the channel bar relative to the said support to press the said strips against the wires.

17. In mechanism for attaching a connecting bar to wires in the formation of a screen cloth, the combination with a support, of a channel bar mounted on said support and having narrow elongated strips at the upper edges of the channel with transverse grooves on each strip in position to engage spaced wires on the screen cloth, and means for pressing the elongated strips against said wires.

18. In mechanism for soldering a connecting strip to a wire screen, the combination with a support, of a channel bar mounted on said support to extend transversely of the wires of the screen, a heating element in the channel of the channel bar, a hot plate above said heating element, strip material in contact with said wires, and means for lifting the heating element to effect pressing against said wires during the soldering thereto of said strip material.

19. In mechanism for soldering a connecting strip to a wire screen, the combination with a support, of a channel bar mounted on said support to extend transversely of the wires of the screen cloth, a heating element in the channel of the channel bar, a metal channel supported on said heating element, an asbestos lining for the bottom of said metal channel, a hot plate on said asbestos lining in said metal channel, and mechanism for effecting upward pressure on said hot plate to secure firm contact with said wires during the soldering of strip material to said wires.

20. In mechanism for soldering a connecting strip to wires of a screen cloth, the combination with a channel bar, of a heating element in the channel of said bar, a hot plate supported on said heating element, connecting strip material, and means pressing the hot plate upwardly to secure firm contact between the same and the wires of the screen cloth during the soldering of the said strip material to said wires.

21. In mechanism for soldering a connecting bar to a parallel wire screen cloth, the combination with a support, of an elongated bar mounted thereon, a connecting bar heater associated with said elongated bar, and means for adjusting the connecting bar heater to facilitate heating of the connecting bar before soldering the same to the parallel wire screen cloth.

22. In mechanism for attaching an intermediate strip to wires in the formation of a screen cloth, the combination with supporting mechanism, of means for holding the wires on the supporting mechanism, a support for an intermediate strip, and mechanism for actuating said support to press said intermediate strip against said wires preparatory to securing the same to said wires.

23. In mechanism for soldering a cross-strip to a wire screen intermediate the ends of the latter, the combination with a support, of a parallel motion jack for adjusting the elevation of said support while keeping it level, a channel bar mounted on said jack to extend transversely of said screen intermediate the ends thereof, a heating element in the channel portion of said channel bar, a channel of solder resisting material above said heating element, a hot plate in the last-named channel, transverse strip material on said hot plate and in contact with said wires, and means extending from said support through said channel bar to said heating element to lift the heating element to force said hot plate against the wires to facilitate soldering of said transverse strip material to the wires of the screen intermediate the ends of the latter.

24. In apparatus for securing a connecting strip to a wire screen intermediate the ends of the latter, the combination with a support, of a parallel motion jack for adjusting the elevation of said support while keeping it level, and means carried by said support for securing the connecting strip to the wire screen intermediate the ends of the latter.

25. In mechanism for securing a connecting strip to a wire screen, the combination with mechanism for supporting the screen, of a carrier for the connecting strip adapted to be supported on the underside of the screen, and means adapted to act on said carrier for pressing the strip against the underside of the wires of the screen preparatory to securing such strip to said wires to connect the same intermediate the ends of the screen.

26. In mechanism for securing a connecting strip to a wire screen, the combination with mechanism for supporting the screen, of a carrier for the connecting strip, means for moving said carrier against the underside of the screen intermediate the ends of the latter, and mechanism comprising a plurality of elevating screws on said carrier for pressing the connecting strip against the undersides of said wires preparatory to securing said strip thereto.

27. In mechanism for securing a connecting strip to a wire screen intermediate the ends of the latter, the combination with mechanism for supporting the screen, of an elongated carrier for the connecting strip, a parallel motion jack for moving said carrier toward the underside of the screen, and mechanism comprising lifting means for pressing the connecting strip against the underside of said wires preparatory to securing said connecting strip to said wires.

28. Mechanism for attaching a pair of connecting bars to a screen cloth, comprising the combination with supporting mechanism for the end bars of the screen cloth, of a support for the connecting bars, and means acting on the said support to hold said connecting bars one after the other in contact with the wires of the screen preparatory to securing the same to such wires.

RICHARD D. HELLER.